United States Patent
Marks et al.

(10) Patent No.: US 10,107,001 B2
(45) Date of Patent: Oct. 23, 2018

(54) CMU COOLING TOWER AND METHOD OF CONSTRUCTION

(71) Applicant: Syntech Towers, LLC, Prairieville, LA (US)

(72) Inventors: Ronald J. Marks, Baton Rouge, LA (US); Mark B. Spring, Baton Rouge, LA (US); Davin O. Spring, Baton Rouge, LA (US)

(73) Assignee: Syntech Towers, L.L.C., Prairieville, LA (US)

( * ) Notice: Subject to any disclaimer, the term of this patent is extended or adjusted under 35 U.S.C. 154(b) by 0 days.

(21) Appl. No.: 15/485,972

(22) Filed: Apr. 12, 2017

(65) Prior Publication Data

US 2017/0218649 A1 Aug. 3, 2017

Related U.S. Application Data

(63) Continuation-in-part of application No. 14/670,796, filed on Mar. 27, 2015, now abandoned.
(Continued)

(51) Int. Cl.
*E04H 5/12* (2006.01)
*F28C 1/02* (2006.01)
(Continued)

(52) U.S. Cl.
CPC ............... *E04H 5/12* (2013.01); *E02D 27/01* (2013.01); *E04B 1/04* (2013.01); *E04B 1/20* (2013.01);
(Continued)

(58) Field of Classification Search
CPC ....... E04H 5/12; E02D 27/01; E02D 2200/16; E02D 2200/1628; E02D 2300/002;
(Continued)

(56) References Cited

U.S. PATENT DOCUMENTS

| 1,647,281 A | 11/1927 | Doyle |
| 1,803,854 A | 5/1931 | Kniskern |

(Continued)

FOREIGN PATENT DOCUMENTS

| DE | 2606429 | 9/1977 |
| EP | 0168525 B1 | 10/1988 |

(Continued)

OTHER PUBLICATIONS

U.S. Appl. No. 15/379,732 (Direct Forced Draft Fluid Cooling Tower)—Examiner's Action dated Apr. 10, 2017.

*Primary Examiner* — Charles S Bushey
(74) *Attorney, Agent, or Firm* — Jones Walker LLP

(57) ABSTRACT

A cooling tower structure having a concrete perimeter foundation wall with a perimeter rebar grouping. The structure includes at least four columns formed of CMU blocks with at least two columns being freestanding and positioned approximate corners of the foundation wall. Each column further includes a column rebar grouping being tied into the perimeter rebar grouping. At least three bond-beams formed of CMU blocks are connected between the columns at least four feet above the foundation. The bond-beams include beam rebar groupings tying into at least one of the column rebar groupings. The structure includes housing walls formed of CMU blocks extending upward from the bond beams. At least one fan is on at least one pedestal column positioned within the foundation wall, with a pedestal rebar grouping extending though the pedestal column from a concrete pedestal footing. A series of water collection troughs are positioned within the cooling tower above the fan and fill media is positioned in the cooling tower above the collection troughs.

20 Claims, 13 Drawing Sheets

Related U.S. Application Data

(60) Provisional application No. 61/967,862, filed on Mar. 28, 2014.

(51) Int. Cl.

| | | |
|---|---|---|
| *F28F 25/04* | (2006.01) | |
| *F28F 25/06* | (2006.01) | |
| *E02D 27/01* | (2006.01) | |
| *E04B 1/04* | (2006.01) | |
| *E04B 1/20* | (2006.01) | |
| *E04C 1/39* | (2006.01) | |
| *E04C 3/22* | (2006.01) | |
| *F28C 1/00* | (2006.01) | |
| *E04C 3/02* | (2006.01) | |
| *E04B 9/02* | (2006.01) | |
| *F28C 1/16* | (2006.01) | |

(52) U.S. Cl.
CPC .................. *E04C 1/39* (2013.01); *E04C 3/22* (2013.01); *F28C 1/00* (2013.01); *F28C 1/02* (2013.01); *F28F 25/04* (2013.01); *F28F 25/06* (2013.01); *E02D 2200/16* (2013.01); *E02D 2200/1628* (2013.01); *E02D 2300/002* (2013.01); *E04B 9/02* (2013.01); *E04B 2103/02* (2013.01); *E04C 2003/023* (2013.01); *F28C 1/16* (2013.01); *F28C 2001/006* (2013.01)

(58) Field of Classification Search
CPC ..... E04B 1/04; E04B 1/20; E04B 9/02; E04B 2103/02; E04C 1/00; E04C 1/39; E04C 3/20; E04C 5/06; E04C 2003/023; E04C 3/22; F28C 1/00; F28C 1/02; F28C 1/16; F28C 2001/006; F28F 25/04; F28F 25/06
USPC ............................................ 261/30, DIG. 11
See application file for complete search history.

(56) References Cited

U.S. PATENT DOCUMENTS

| | | | |
|---|---|---|---|
| 1,866,193 A | 7/1932 | Coutant | |
| 3,214,351 A | 10/1965 | Lichtenstein et al. | |
| 3,217,631 A | 11/1965 | Thompson et al. | |
| 3,259,177 A | 7/1966 | Niemann | |
| 3,290,025 A | 12/1966 | Engalitcheff, Jr. | |
| 3,384,165 A | 5/1968 | Mathews | |
| 3,402,653 A | 9/1968 | Lex | |
| 3,647,191 A | 3/1972 | Fordyce | |
| 3,750,418 A | 7/1973 | Mauldin | |
| 3,803,997 A | 4/1974 | Van Raden | |
| 3,834,129 A | 9/1974 | Darlinger et al. | |
| 3,834,681 A | 9/1974 | Fordyce et al. | |
| 3,917,765 A | 11/1975 | Furlong et al. | |
| 3,968,738 A | 7/1976 | Matzke | |
| 4,014,669 A | 3/1977 | Thompson et al. | |
| 4,164,399 A | 8/1979 | Kannapell | |
| 4,196,157 A | 4/1980 | Schinner | |
| 4,196,551 A | 4/1980 | Bondarenko et al. | |
| 4,198,215 A | 4/1980 | Regehr | |
| 4,273,733 A | 6/1981 | Kals | |
| 4,299,785 A | 11/1981 | Fougea | |
| 4,416,835 A | 11/1983 | Bosne | |
| 4,422,983 A | 12/1983 | Bardo et al. | |
| 4,500,330 A | 2/1985 | Bradley, Jr. et al. | |
| 4,521,350 A | 6/1985 | Lefevre | |
| 4,541,968 A | 9/1985 | Ernst et al. | |
| 4,543,218 A | 9/1985 | Bardo et al. | |
| 4,759,315 A | 7/1988 | Chiou et al. | |
| 4,981,113 A | 1/1991 | Kannan et al. | |
| 5,000,883 A | 3/1991 | Leva | |
| 5,227,095 A | 7/1993 | Curtis | |
| 5,268,011 A | 12/1993 | Wurz | |
| 5,474,832 A | 12/1995 | Massey | |
| 5,487,531 A | 1/1996 | Curtis | |
| 5,545,356 A | 8/1996 | Curtis et al. | |
| 5,958,306 A | 9/1999 | Curtis | |
| 6,527,258 B2 | 3/2003 | Bartlok | |
| 8,585,024 B2 | 11/2013 | Ferree et al. | |
| 9,033,318 B2 | 5/2015 | Curtis | |
| 9,562,729 B2 | 2/2017 | Curtis | |
| 9,568,248 B2 | 2/2017 | Curtis | |
| 9,841,238 B2* | 12/2017 | Curtis | ........... F28C 1/02 |
| 2006/0021393 A1 | 2/2006 | Oda et al. | |
| 2007/0187851 A1 | 8/2007 | Facius et al. | |
| 2015/0241148 A1 | 8/2015 | Curtis | |
| 2015/0276318 A1* | 10/2015 | Marks | ........... F28C 1/00 261/89 |
| 2015/0330710 A1 | 11/2015 | Curtis | |

FOREIGN PATENT DOCUMENTS

| | | |
|---|---|---|
| EP | 0931993 | 7/1999 |
| EP | 0931993 A1 | 7/1999 |
| GB | 689805 | 4/1953 |
| JP | S49-11345 | 1/1974 |
| JP | S51-125666 | 11/1976 |
| JP | S52-19245 | 2/1977 |
| JP | H09-89493 | 4/1997 |
| JP | H10-220972 | 8/1998 |
| JP | 2000-130800 | 5/2000 |
| JP | 2002-370518 | 12/2002 |
| JP | 2003-314972 | 11/2003 |
| JP | 2004-232925 | 8/2004 |
| JP | 2008-292065 | 12/2008 |
| JP | 2009002528 | 1/2009 |
| WO | 99/19055 | 4/1999 |
| WO | 2004/072569 | 8/2004 |
| WO | 2009/070691 | 6/2009 |
| WO | 2012/072829 A1 | 6/2012 |

* cited by examiner

CMU COOLING TOWER AND METHOD OF CONSTRUCTION

CROSS-REFERENCE TO RELATED APPLICATIONS

This application is a continuation-in-part of U.S. Nonprovisional application Ser. No. 14/670,796 filed Mar. 27, 2015, now abandoned, which application claims the benefit under 35 USC 119(e) of U.S. Provisional Application Ser. No. 61/967,862, filed Mar. 28, 2014, both of which are incorporated by reference herein in their entirety.

BACKGROUND

This application relates to methods of constructing water cooling towers, with particular embodiments related to the use of concrete masonry units (CMUs).

Water cooling towers are well known, and are a common heat-exchange component in large commercial, medical, and industrial HVAC systems, in cooling for industrial processes, and aeration of water for other purposes. Cooling towers are a standard part of new construction of buildings or campuses of buildings. Many existing buildings also need replacement or supplemental cooling towers because of the inadequacy of present cooling towers due to increased demands, higher temperatures, consolidation into campus-wide HVAC systems, or deteriorating performance of existing cooling towers.

An under-performing cooling tower can be a large problem for commercial properties, medical facilities, and industries, affecting the efficiency and therefore the operating costs of HVAC and industrial systems, and affecting the comfort and therefore the satisfaction, health, and productivity of persons. Under such circumstances, existing cooling towers need to either be replaced or be supplemented with new cooling towers. But replacement requires taking an existing cooling tower out of service and waiting for the construction of a new cooling tower to be completed. And supplementation requires finding a new location for the new cooling tower, and then waiting for its construction to be completed.

One common type of industrial cooling tower is a counterflow tower where water falls by gravity through fill media from water nozzles positioned in the upper part of the cooling tower. A water collector pan is positioned below the fill layer. The water is directed to a downstream water basin, from where it is re-circulated back into the spraying nozzles on top. A source of moving air is mounted on or in the cooling tower, directing the cooling air toward the water.

Cooling towers exploit the evaporative cooling of water exposed to air. Therefore they are generally located outside. Cooling towers must provide a very large surface area for water to interact with air. Therefore cooling towers are often very large structures—with one example being at least a 20-square-foot footprint and at least 10 feet of height—and some towers being many times that large. Powerful motorized fans are generally required to provide adequate air flow. Water is heavy, and powerful fans are heavy, and therefore cooling towers are heavy structures when in use, and the basic structure of the cooling tower must be capable of withstanding the internal forces of the heavy moving water and heavy moving fan, and the external forces of the outside environment.

Cooling towers are typically located outside, take up a lot of space, can be noisy, and may generate mist or vapor. They are typically placed on the roofs of high-rise buildings or in otherwise out-of-the-way locations on the grounds or the campus. Such locations present problems in the construction and installation of cooling towers. A heavy crane might be necessary—for months—in order to lift construction materials or pump concrete onto a rooftop or into an inaccessible area at ground level. There might be very little adjacent "laydown" or staging area for construction crews, materials, and equipment.

Industrial cooling towers made of wood in the traditional way are susceptible to fire and to rot and early deterioration in the constantly wet cooling-tower environment, requiring proper preparation and constant maintenance throughout the operational life of the cooling tower.

Cooling towers made of steel are known, but are very expensive, very heavy to transport and erect, and require highly skilled workers in the design phase, any pre-fabrication phase, and in the erecting or construction phase, in order to avoid potential failure, improper fitting of components, or even injury to persons and property. Also, steel is subject to rusting and deteriorating in the constantly wet environment if it is not properly prepared and constantly maintained throughout the operational life of the cooling tower.

Cast-concrete cooling towers can be built using the shuttering method, where sections of the framework are built using wooden forms; then concrete is poured into the forms to make a first lateral row. After the concrete sets, the next lateral layer is formed, filled with concrete, and allowed to set. This process continues until the structure reaches the desired height. The construction of such a tower is a major undertaking requiring many months, even a year, to complete. The logistics and heavy equipment required are extensive. Such traditional towers have underground basins and require extensive engineering and design in advance of construction.

Fordyce and Fritz (U.S. Pat. No. 3,834,681 A) teach an open-frame, prefabricated, concrete cooling tower structure. Furlong, et al. (U.S. Pat. No. 3,917,765 A) teach a cooling tower shell of factory-made pre-cast concrete parts. Curtis (U.S. Pat. No. 5,227,095 A) teaches a cooling tower system consisting of individual modules, which can be built from fiberglass in a factory and then transported to and erected on site. Curtis and Oberlag (U.S. Pat. No. 5,545,356 A) teach a method of constructing a cooling tower structure by casting the concrete walls on site in a horizontal position and then raising the walls to a vertical position—a "tilt-up" construction, or by pre-casting concrete modular wall units off-site and transporting and erecting them on site.

There is some question whether "tilt-up" and some other concrete pre-fabrication methods are capable of producing stable structures generally. For example, concerns about, and even requirements to retrofit, such structures in earthquake-prone areas.

Concrete pre-fabrication, like steel, requires highly skilled workers in the design phase, the pre-fabrication phase, and in the erecting or construction phase, in order to avoid potential failure, improper fitting of components, or even injury to persons and property.

All of the presently known methods of constructing cooling towers have at least one of the disadvantages of being insufficiently durable, too expensive, too difficult to transport, too long to place into operation, too difficult to erect or construct without highly skilled labor and long-term use of heavy machinery, and too difficult to maintain over the operational lifetime of the cooling tower.

Concrete masonry units (CMUs) and proper construction methods and standards for their manufacture and erection are known in other fields of construction. The advantages of CMUs include very low cost, greater strength at lighter weight than cast or pre-cast concrete, and the ability of masons of ordinary skill to quickly build structures according to already well-known methods. In CMU construction, hollow concrete blocks are reinforced with steel rebar or similar material and filled with concrete, mortar, or grout, with construction proceeding layer by layer, continuously, without having to wait for each concrete layer to set.

SUMMARY OF SELECTED EMBODIMENTS OF THE INVENTION

One embodiment of the present invention provides a cooling tower constructed of multiples of standard concrete masonry units (CMUs) properly reinforced, using standard CMU construction methods and specifications, and using masons of ordinary skill, costing less for construction and maintenance, requiring less heavy equipment, less transportation and lifting of heavy and large components, a smaller construction work site, and requiring significantly less time to construct and make operational.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
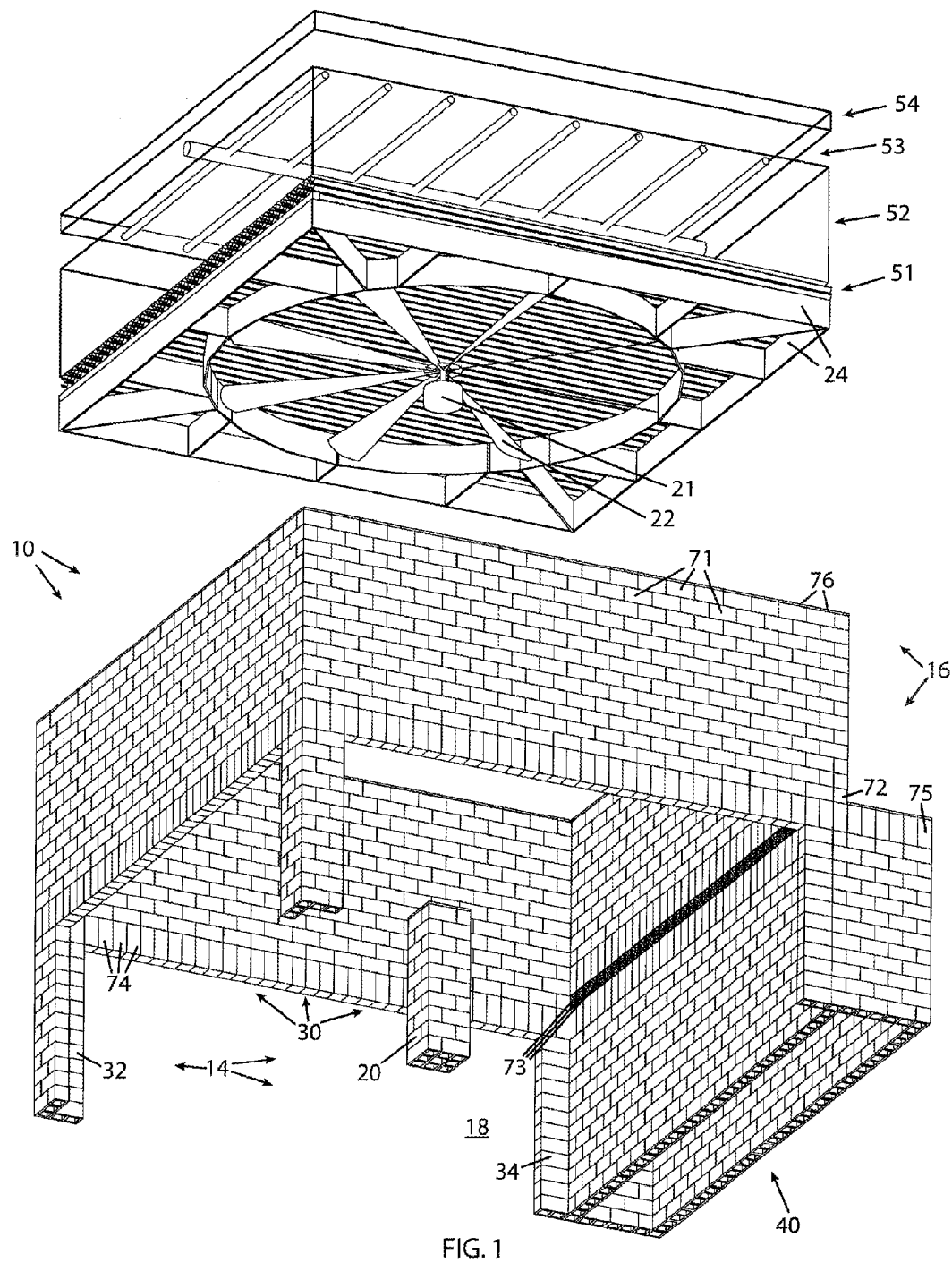
FIG. 1 is a partially exploded orthogonal perspective view of one embodiment of the invention and of the cooling components housed therein.
Figure 2:
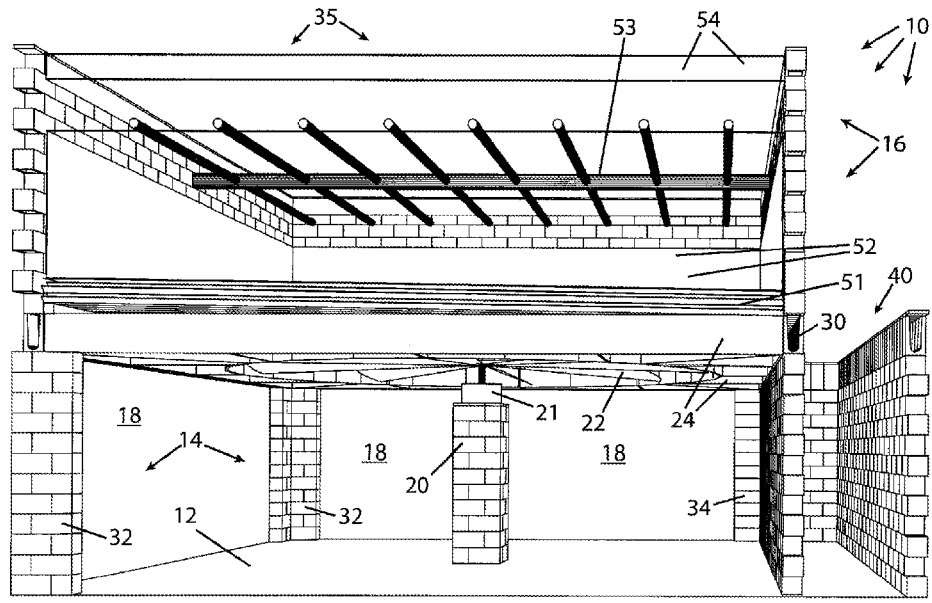
FIG. 2 is a partially cutaway side perspective view of the FIG. 1 embodiment and of the cooling components housed therein.

Referring to FIG. 1 & FIG. 2 the counterflow type of cooling system known in the art comprises, from top to bottom, an optional drift eliminator 54 for the purpose of catching sprays and mists of water and retaining them in the cooling system, a nozzle array 53 that sprays water to maximize the available surface area of water droplets for evaporative cooling, a thick layer of porous fill media 52 to further spread out the water droplets and to prolong their exposure to the cooling stream of air, and a water collector 51 that catches and channels the cooled water but allows the flow of cooling air from below.

Figure 3:
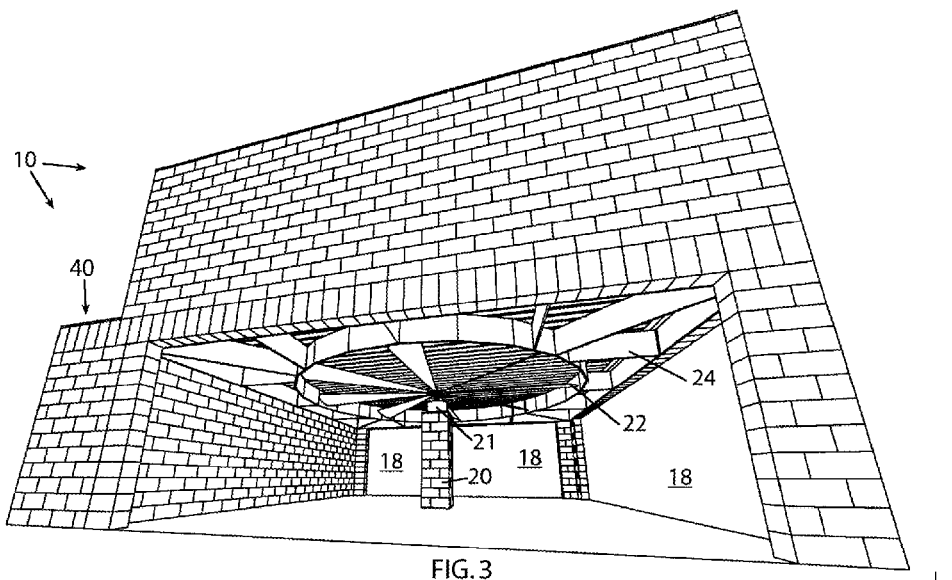
FIG. 3 is a low perspective side view of the FIG. 1 embodiment and of the cooling components housed therein.

The forced-air counterflow type of cooling system known in the art further comprises a fan 22 driven by a fan motor 21 and surrounded by a fan shroud 24, with the fan assembly located below the rest of the cooling system, which puts the fan assembly closer to the ground or mounting surface, which is advantageous for maintenance purposes and for weight-distribution purposes. See FIG. 3.

The forced-air counterflow type of cooling system is often very large, in order to move a great volume of air across a great surface area of water. The cooling system for which a preferred embodiment of this invention is designed is approximately 24 square feet across and 8 feet deep, with an approximately 20-foot fan. In order to move a sufficient amount of air, the fan 22 should be mounted far enough above the ground or mounting surface, and with as few structural restrictions as possible, in order to provide an open chamber 18 allowing sufficient air intake.

Water is heavy, and 20-foot fans are heavy, so cooling systems are heavy. The forced-air counterflow type of cooling system is therefore a very heavy structure that must nevertheless be mounted high off the ground or mounting surface, and remain stable for many years of operation despite internal stresses from the constant movement of water and air and the machinery that moves them, and external stresses from weather, maltreatment, accident, or other circumstances related to the cooling towers being placed outside on rooftops, in parking lots, or in other exposed places.

Although a stable cooling tower structure might be achieved by adding to and reinforcing the supporting structure below the level of the fan, adding more material in that area would inevitably reduce the air intake flow. The requirements for strength and stability run counter to the requirements for height and openness. Cooling towers present another conundrum; they are usually located in places where it is difficult to set up a construction project and difficult to move materials and heavy equipment.

Presently known cooling tower structures and methods of construction largely comprise some type of cast concrete or pre-cast, pre-stressed concrete either as large components or as pre-fabricated sections. It is difficult to move large amounts of just-mixed concrete from several trucks at street level up to the rooftop of a tall building, and even where access is not so limited, pouring concrete has to be done in stages and requires a lot of time for completion. Moving large concrete components and pre-fabricated sections to the rooftop of a tall building or other inaccessible or constricted location is similarly difficult and expensive. Many embodiment disclosed herein address these problems.

Figure 4:
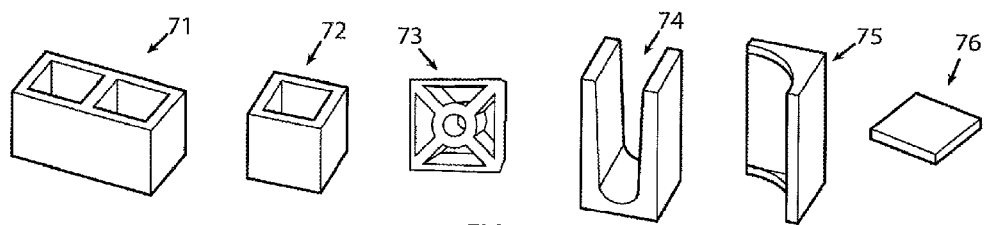
FIG. 4 is a perspective view of the types of CMU components used in the disclosed embodiments.

In one embodiment of the present invention is a cooling tower structure 10 made entirely of multiples of 6 sizes or styles of standard CMU concrete blocks 71, 72, 73, 74, 75, 76, reinforced and installed using standard materials and methods. See FIG. 4. The CMUs are cheaply and readily available everywhere, and a large number of masons everywhere know how to install them properly. CMUs, especially the autoclaved aerated ones, are relatively light for their strength, and can be handled by the single unit or reasonable-sized groups of units, and therefore can be transported, stored, and placed into position much more easily than other building materials.

Figure 9:
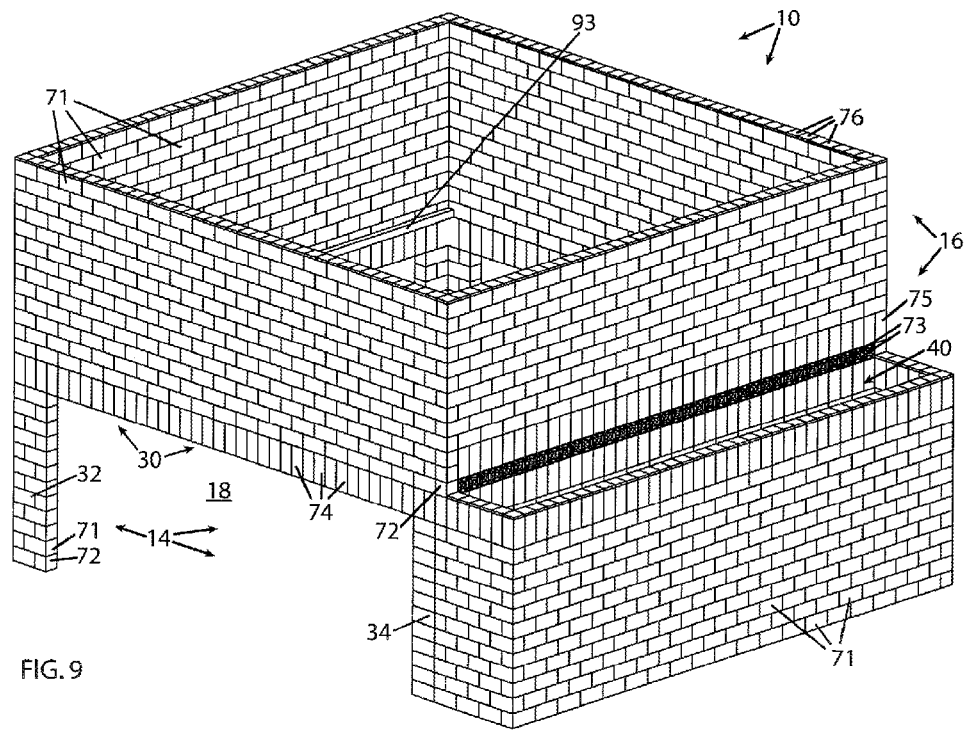
FIG. 9 is an orthogonal perspective side view of an embodiment of the invention.

In a preferred embodiment, FIG. 9, the cooling tower structure is 30 feet in the longer horizontal dimension, which includes the water basin 40 or reservoir, 26 feet in the shorter horizontal dimension, and 18 feet tall, supporting the fan 22 at about 9 feet off the ground surface and the other cooling-system elements above the fan. This embodiment accommodates a cooling system 24 feet by 24 feet wide and up to 10 feet deep, having a fan size of up to 24 feet, although a 20-foot fan would probably be sufficient. This embodiment uses 1576 8-by-16-by-8-inch CMUs 71, 26 8-by-8-by-8 CMUs 72, 234 deep-lintel 16-by-8-by-8 CMUs 74, 6 corner 16-by-8-by-8 CMUs 75 for terminating some of the bond beams 30, 37 perforated 8-by-8-by-8 CMUs 73 which allow collected cooled water to flow into the basin 40, and 209 capping 1-by-8-by-8 CMUs 76. Other than the reinforcing rods 90 and the cement 78, mortar, or grout, no other construction materials are needed except for fasteners to support and secure the cooling system in place in the cooling tower.

Figure 11:
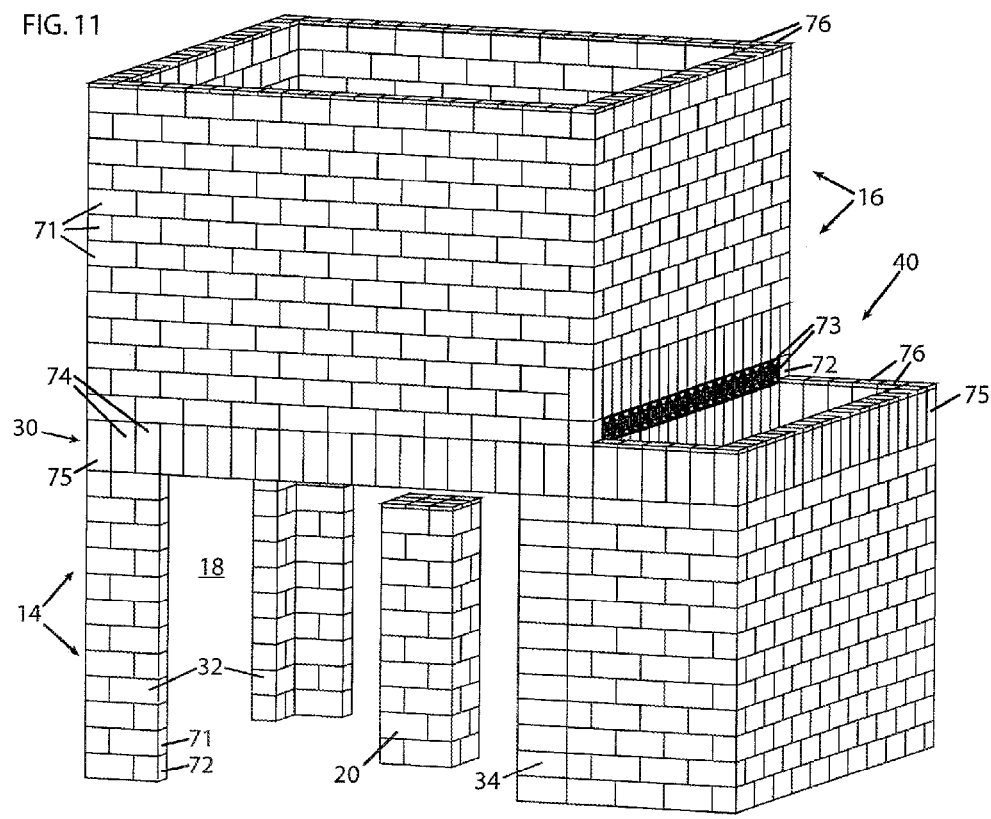
FIG. 11 is an orthogonal perspective side view of an embodiment of the invention.
Figure 12:
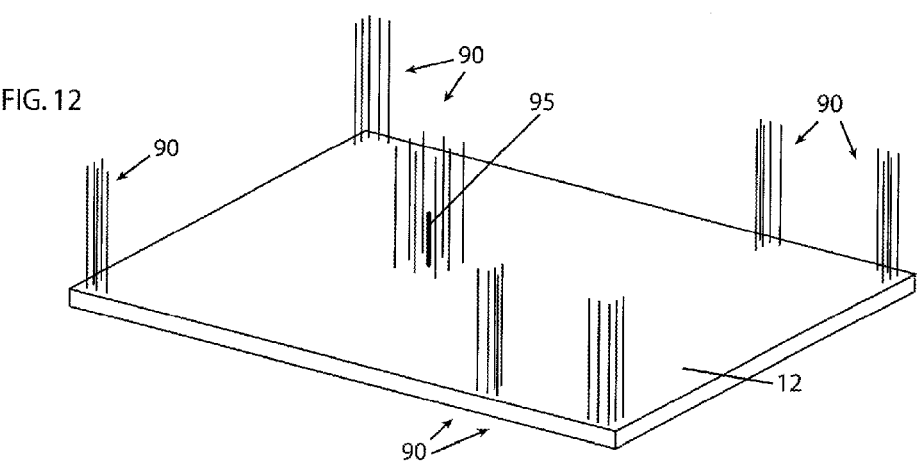
FIG. 12 is an orthogonal perspective side view of the foundation and embedded rebar and conduit of an embodiment of the invention.

In a smaller embodiment, FIG. 11, the cooling tower structure is 18 feet in the longer horizontal dimension, 14 feet in the shorter horizontal dimension, and the same 18 feet tall, supporting the fan 22 at about 9 feet off the ground surface and the other cooling-system elements above the fan. This embodiment accommodates a cooling system 12 feet by 12 feet wide and up to 10 feet deep, having a fan size of up to 12 feet, although a 10-foot fan would probably be sufficient. This smaller embodiment uses 918 8-by-16-by-8-inch CMUs 71, 27 8-by-8-by-8 CMUs 72, 126 deep-lintel 16-by-8-by-8 CMUs 74, 6 corner 16-by-8-by-8 CMUs 75 for terminating some of the bond beams 30, 19 perforated 8-by-8-by-8 CMUs 73 which allow collected cooled water to flow into the basin 40, and 119 capping 1-by-8-by-8 CMUs 76.

Figure 14:
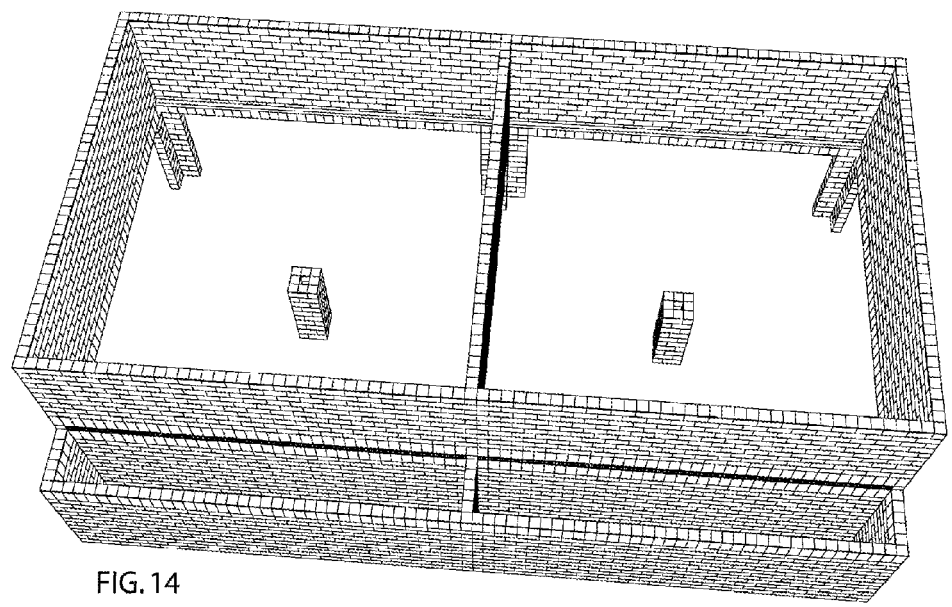
FIG. 14 is a perspective view of an embodiment having two connected cooling towers.
Figure 15:
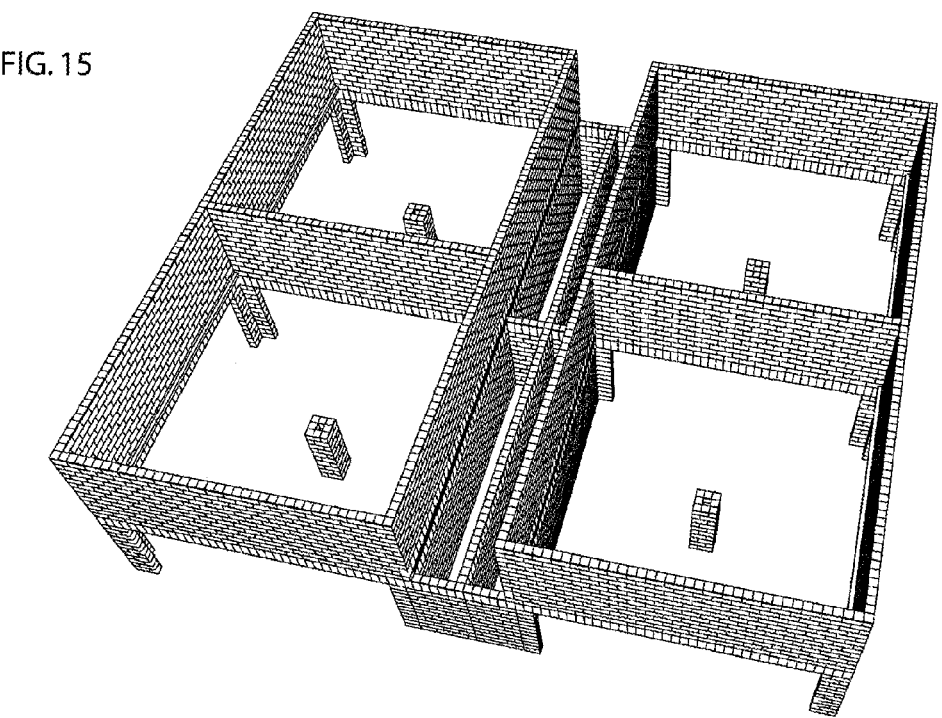
FIG. 15 is a perspective view of an embodiment of the invention having four cooling towers connected with the water-basins in the center.
Figure 16:
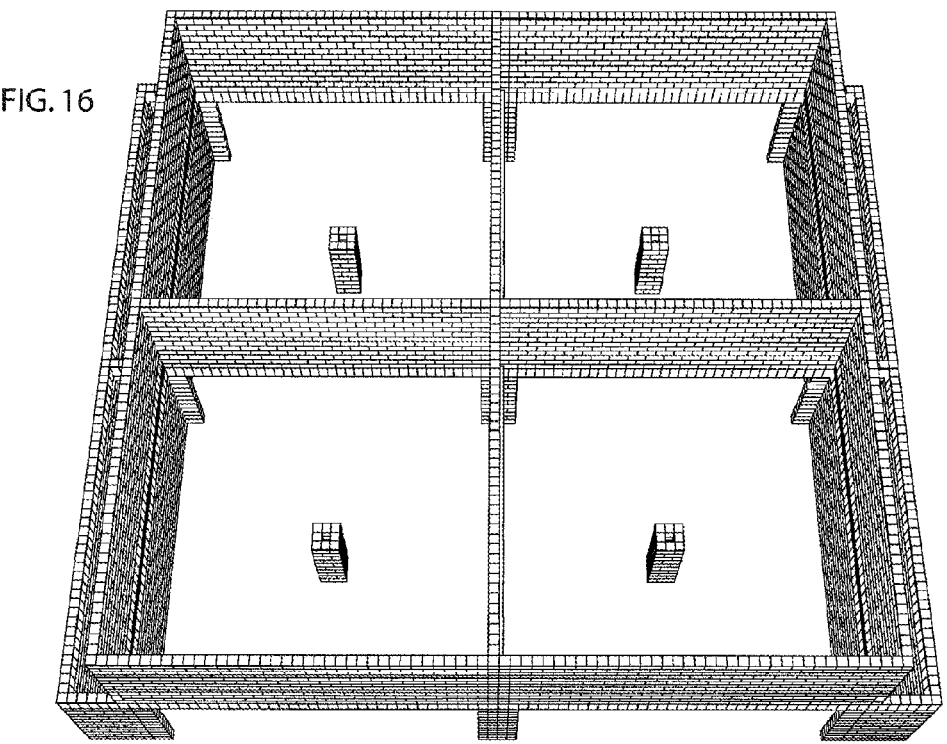
FIG. 16 is a perspective view of an embodiment of the invention having four cooling towers connected with the water basins to the outside.

In other embodiments, cooling tower support structures can be built or added onto together, sharing common walls, in several configurations. FIG. 14 shows a two-tower configuration having a footprint of 30 feet by 51.3 feet and requiring 2838 of the large CMUs 74. FIG. 15 & FIG. 16 show four-tower configurations having footprints of 51.3 feet by 59.3 feet and requiring 5214 of the large CMUs 74.

The large, unobstructed open chamber 18 of the invention is made possible by the use of very long bond beams 30 or lintels, spanning, for example, 22 feet each in 3 spans of a preferred embodiment.

Figure 5:
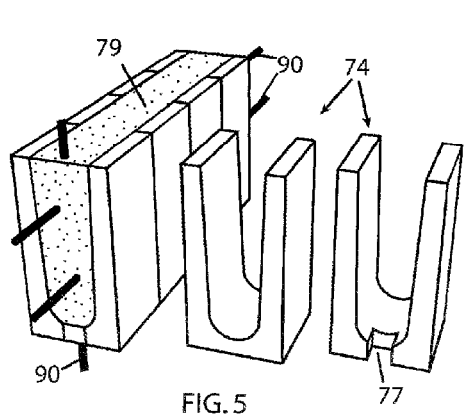
FIG. 5 is an illustration of the construction method for the deep lintel type of CMU used in certain embodiments.

Referring to FIG. 5, the illustrated cooling tower structure comprises six lateral bond beams 30 or lintels constructed from deep lintel CMUs 74 having a deep "U" shape that accommodates the placement of a reinforcement bar 90 such as steel rebar in a horizontal orientation spanning and connecting or bonding the units, and filling with cement 78, mortar, or grout in order to secure the CMUs 74 and the reinforcement bar 90 in place. Where a deep lintel CMU 74 sits over another CMU, such as at a corner, it can be vertically secured by placing a reinforcement bar 90 through a notch 77 in the face of CMU that is mounted downward.

Figure 6:
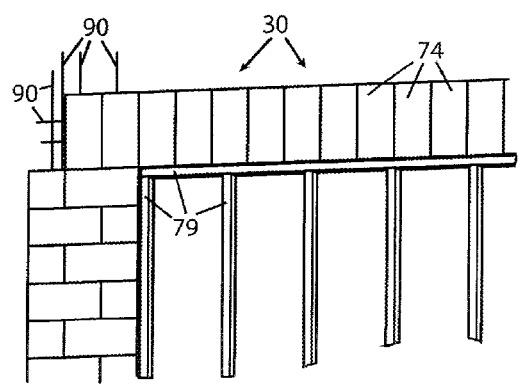
FIG. 6 is an illustration of the construction methods of the use of reinforcing rebar and of temporarily supporting the deep lintel types of CMUs used in certain embodiments.
Figure 7:
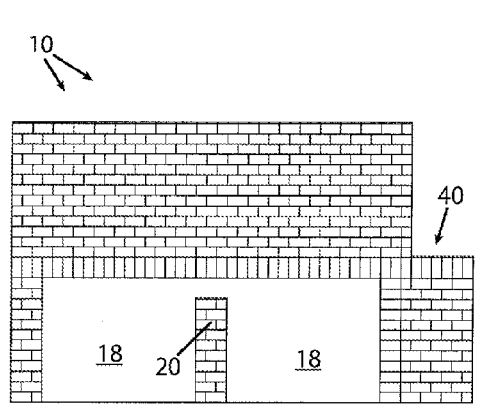
FIG. 7 is an orthogonal side view of the FIG. 1 embodiment.
Figure 8:
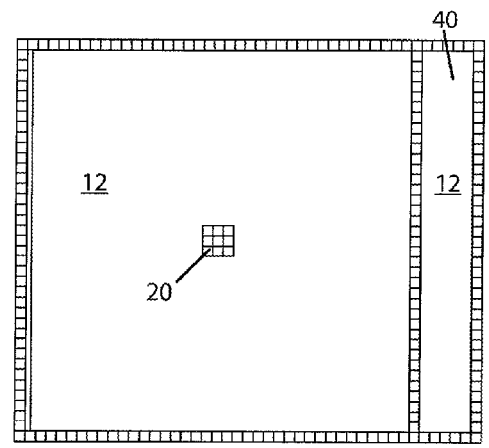
FIG. 8 is an orthogonal top view of the FIG. 1 embodiment.

Referring to FIG. 6, during construction of the lateral bond beams 30 or lintels, the blocks over the span can be temporarily supported with material such as lumber, such as 2-by-4 lumber 79. Such temporary support is only needed while the cement 78, mortar, or grout sets up and secures the supporting material. With such a temporary support, the placement of courses of CMUs above the bond beams 30 is allowed to proceed without waiting for any set-up of the bond beam. Alternatively, the bond beams may be constructed on an adjacent flat surface and subsequently hoisted into place.

Figure 13:
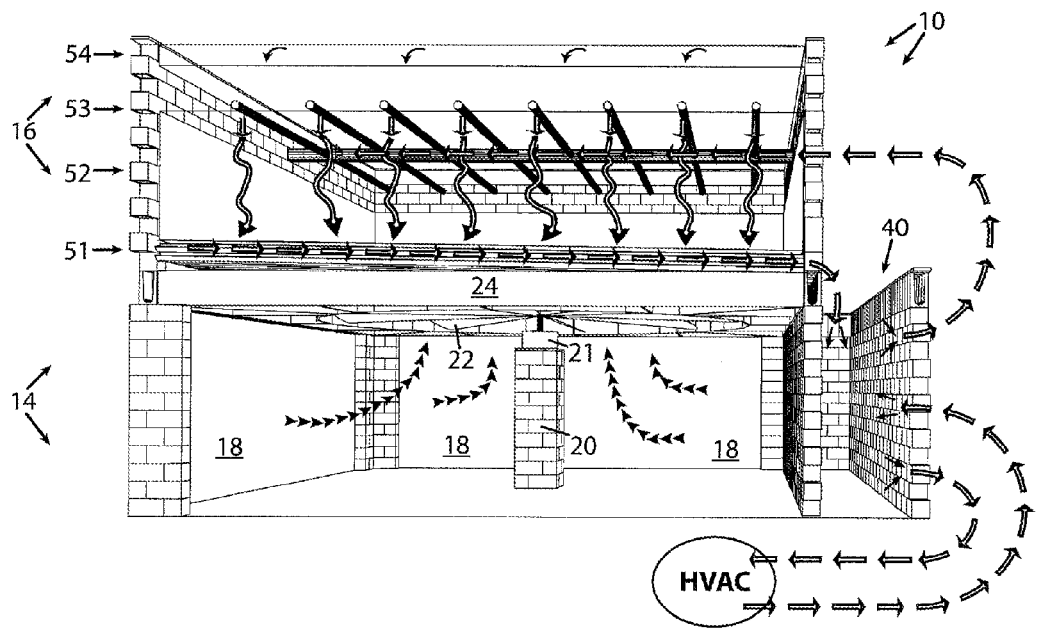
FIG. 13 is an illustration of the function of one embodiment in operation.

FIG. 13 illustrates the normal use of the cooling tower structure with the cooling system in place. The fan motor 21 and fan 22 are supported on a fan pedestal 20 which is securely attached to the foundation 12 in order to withstand the weight and the torque of the fan, and which encloses the electrical supply for the fan. In the lower portion 14, the fan draws air from the large open chamber 18 and blows the air upward against the downward travel of water through the cooling system mounted in the upper portion 16. Water is taken from the above-ground water basin 40 and is pumped into the nozzle array 53 that sprays water over the porous fill media 52 through which the water droplets travel downward at a pace that is slowed both by the fill media and the counter-flow of air, which prolongs the time available for evaporative cooling. An optional drift eliminator 54 mounted above the nozzle array 53 catches sprays and mists of water and retains them in the cooling system. Finally a water collector 51 that allows the flow of cooling air from below catches and channels the cooled water along its slight slope downward toward and into the water basin 40 from whence the water had come, completing one of the two loops of the system's operation.

In many embodiments, the purpose for cooling the water in the basin 40 is to use that cooled water in one or more heat exchangers that are components of HVAC systems or cooling systems for industrial processes. In the second loop of the system's operation, cooled water is pumped from the basin 40 to the target HVAC or cooling system or systems where it undergoes a heat exchange, and is pumped back into the basin 40 for another iteration of the two loops.

The proper functioning of a cooling tower is critical to the functioning of HVAC systems and other cooling systems. If a cooling tower fails, it must be repaired or replaced. If a cooling tower is under-performing, or is under-specified in light of possibly unforeseen increased needs, it must be either replaced with or supplemented with another cooling tower. And such replacement or supplementation is likely to be needed immediately, where the efficient functioning of an enterprise is being hampered by a broken or under-performing cooling tower. The several months' long construction times of present cooling towers are costly to the enterprises needing new cooling towers.

The cooling-tower structure of many embodiments is able to be constructed very quickly, in a matter of only a few days, for several reasons:

The materials, known quantities of six different sizes and styles of standard CMU blocks are universally available at small cost, are available on pallets of manageable size and weight that can be moved with a standard forklift, and can be quickly secured and transported to any job site. The only other materials, rebar and sacks of cement, mortar, or grout, are equally as easily available. There is no waiting period for anything to be pre-fabricated or to be secured and transported from a remote location.

The construction materials can be delivered to the job site—which might be the roof of a tall building—without the delays of arranging special shipments from far away, without arranging and waiting for special equipment such as cranes, and then waiting for permission to block streets with such equipment, and without arranging for the delivery and transfer of mixed concrete for on-site pouring to job sites that are not directly accessible to cement-mixer trucks.

The construction work can be performed by any block mason of average competence and experience, using standard methods. Therefore there is a greater chance that such a block mason will be available no matter the locale or the timing of the construction. Also, the construction work can proceed more quickly by adding more block masons, up to a point, and by adding additional shifts of block masons.

The construction work can proceed continuously to completion without waiting for any curing, drying, or setting up, or waiting for any special personnel or any special tool or material to arrive on site.

The cooling-tower structure that results from the very quick construction time of only a few days, even in difficult locations, is very sturdy, long-lasting, and inherently two-hour fire-rated.

Figure 10:
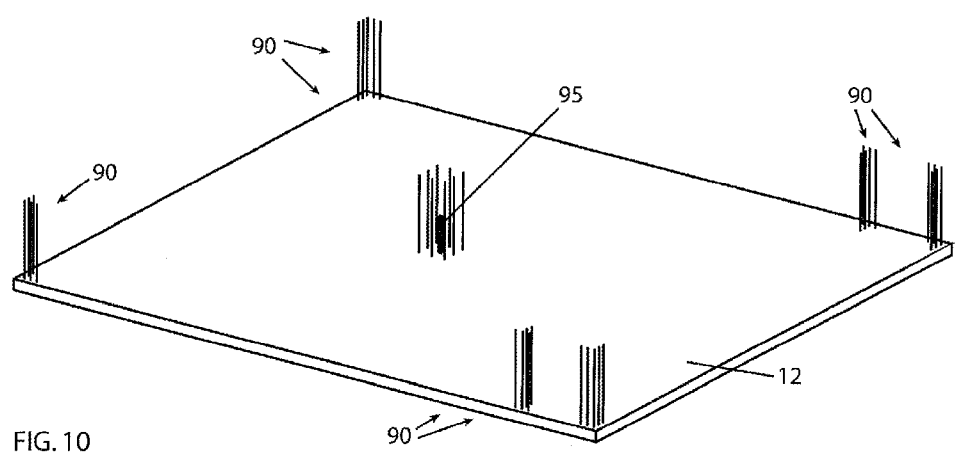
FIG. 10 is an orthogonal perspective side view of the foundation and embedded rebar and conduit of an embodiment of the invention.

The cooling-tower structure should be constructed on a suitable foundation, where the suitability will be determined by the specific construction site and conditions, which might range from a reinforced-concrete rooftop to a swampy spot of unused ground. FIG. 10 illustrates a foundation for the preferred embodiment of FIG. 9, and FIG. 11 illustrates a foundation for the smaller alternate embodiment of FIG. 11. In addition to whatever reinforcement and other requirements might be necessary for a particular foundation on a particular site, the foundation 12 should be of a size matching the footprint of the intended cooling-tower structure, which is 30 feet by 26 feet for the preferred embodiment here. Vertical reinforcement bars 90 or rebar should be embedded in the foundation 12 and attached to any horizontal reinforcement within the foundation. The placement of these vertical reinforcement rods is at the corners of the square tower structure under the corner columns 32, 34, plus the outer corners of the water basin 40, plus the eventual location of the fan pedestal 20, which is at the center of the square formed by the upper portion 16 of the cooling tower, disregarding the water basin 40.

The length of the vertical reinforcement bars 90 embedded in the foundation 12 does not have to extend the full height of the cooling tower, and the length is not critical because additional reinforcement bars can be placed in upper courses, as is standard and known in the art.

The secure attachment of the fan pedestal to the foundation is important because of the weight and the torque generated by the fan 22 in operation.

Additionally, electrical conduit 95 for electric power to the fan may be incorporated in the foundation and terminated under the location of the fan pedestal 20, although such electric power can also be run through surface-mounted conduit or by other conforming means.

Turning now to the illustrated embodiments in more detail, numeral 10 designates the water cooling tower. It should be noted that the water cooling tower is only one example of the structure that can be constructed using the apparatus and method of the present invention. The cooling tower 10 comprises a hollow structure having a foundation 12, a lower portion 14 supported by the foundation 12, and an upper portion 16 supported by the lower portion 14. The exemplary embodiment described herein is of a water cooling tower of counterflow design, where the air flow is directly opposite to the water flow. Air flow first enters an open area beneath the fill media, and is then drawn up vertically. The water is sprayed through pressurized nozzles near the top of the tower, and then flows downward through the fill, opposite to the air flow.

The lower portion 14 defines an open chamber 18, where a fan pedestal 20 is mounted. A motorized fan 22 is mounted on top of the fan pedestal 20, with the fan and motor being protected by a fan shroud 24. The fan shroud is supported by freestanding rear corner columns 32 and mid corner columns 34 incorporated into the above-ground water basin 40. A lateral bonding beam 30 separates the lower portion 14 from the upper portion 16, the lateral bonding beam 30 resting on the four columns of the lower portion 14.

A water collector assembly 51 is positioned in the upper portion 16 above the lateral beam 30. The water collector assembly can be a series of troughs or one large trough configured to direct collected water away from the upper portion 16. The water collector unit 51 is mounted at an angle to direct water by gravity into a basin 40 located above ground on the foundation 12. An angle of approximately 2 degrees, or a 4-inch drop over a 24-foot span is sufficient. In an embodiment, the proper mounting angle is created by a spacer 93 shown in FIG. 9 that provides a 4-inch rise and that may be made of various material, including concrete or steel, and may be incorporated into the construction of the cooling-tower structure, or into the installation of the cooling system into the tower structure, or may built into the water collector 51 itself.

Pumps, known in the art, are used to circulate water through the cooling tower and from the cooling tower to the HVAC or cooling system or systems served by the cooling tower. Waterproofed piping and connections, also known in the art, can be placed through holes made in the cooling-tower structure and the water basin at the appropriate locations. The upper portion 16 defines an open space where the fill media 52 is deposited. Water is pumped from the basin 40 and sprayed through the nozzle assembly 53 and passes through the fill media before flowing into the water collector unit 51.

The corner columns 32, 34 are constructed from CMU blocks of 16-inch and 8-inch lengths, in alternating courses, as shown, using construction methods of reinforcement and filling with concrete, mortar, or grout known to block masons of normal skill and competence. Each column provides 40 square inches, in cross section, of support, and each is secured in 5 places to the foundation 12 through the vertical reinforcement bars 90.

Because the CMU blocks themselves define the structural frame for the concrete, there is no need to wait for the concrete to set in a lower course or layer before placing additional courses on top, and construction can proceed without delay.

After the corner columns 32, 34 are constructed from standard 16-inch and 8-inch CMUs 71, 72 the lateral bond beams 30 can be constructed from deep lintel CMUs 74. A temporary support structure 79 can be used to hold the lateral bond beams 30 in place until the concrete 78, mortar, or grout securing the reinforcement bars 90 sets up. In the alternative, the deep lintel CMUs 74 comprising the bond beams 30 can be assembled on an adjacent flat surface and later hoisted into place. Because the exact materials and dimensions of the bond beams 30 are known in advance, they can be assembled in advance of the time they are needed to be put in place.

The bond beam 30 is constructed from deep lintel CMUs 74 securely bonded together by reinforcement bar 90 and concrete 78, mortar, or grout, and effectively forming a lintel. Where a deep lintel CMU 74 sits over another CMU, such as at a corner, it can be vertically secured by placing a reinforcement bar 90 through a notch 77 in the face of CMU that is mounted downward. A vertical reinforcement bar is positioned transversely to the horizontal reinforcement bar or bars. The vertical reinforcement member 90 extends through the notch 77. The preferred materials of construction are CMU concrete blocks with a waterproof coating applied to the inside walls of the cell and basin to prevent water seeping through the blocks.

The structure of the illustrated embodiments require only an above-ground foundation with only a single conduit in the slab for power and controls for the fan. Once the foundation is completed, the blocks will arrive by truck and the block masons can immediately begin installing blocks. A single cell tower can be erected in 3 working days. Multiple cells can be staged with additional block masons and can go up just as quickly. No special equipment (i.e. cranes, forklifts, etc.) are required to erect the tower. A crane will be required to set the water collectors inside the erected tower. The lifts required to install the collectors are less than 1,000 lbs. per lift so the size of the crane required is minimal. Everything else will be installed by hand. The total time required to install a working cell is less than two weeks.

Figure 17:
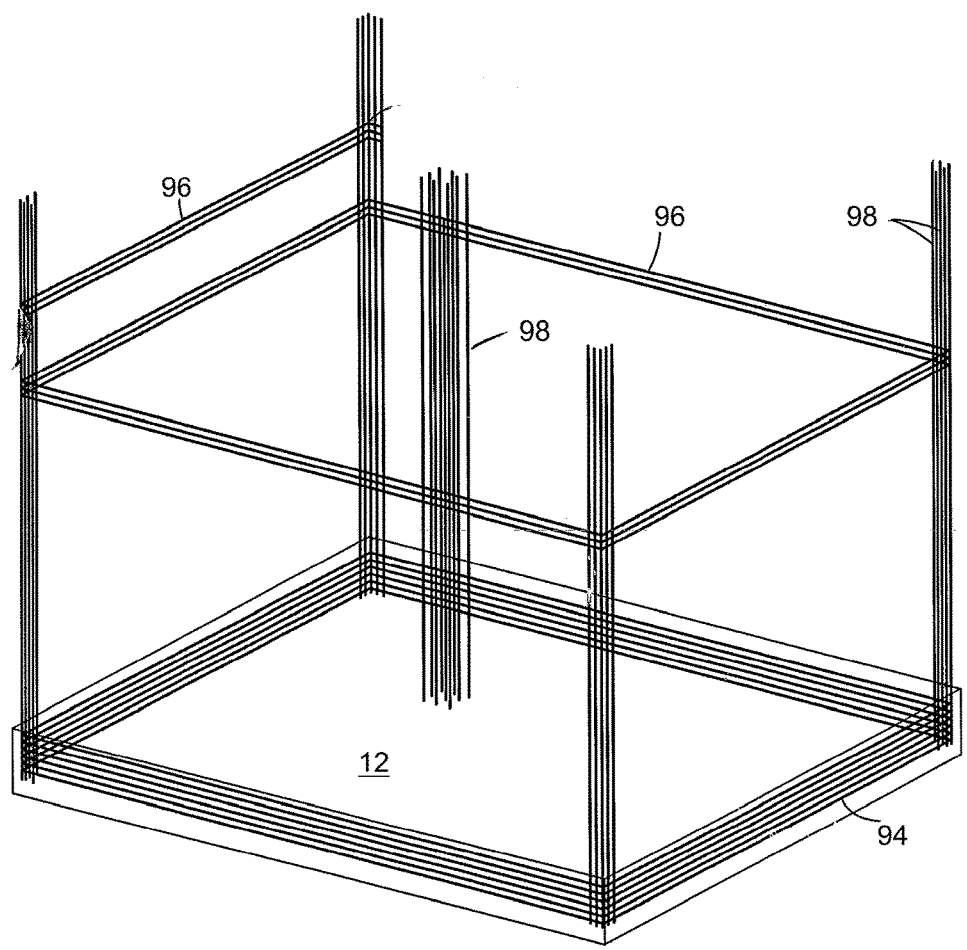
FIG. 17 is a perspective view of the rebar arrangement of one embodiment of a cooling tower.

FIG. 17 illustrates another embodiment of the current invention, a method of constructing a cooling tower structure or housing which will contain the various components of the cooling tower system. FIG. 17 shows a rectangular concrete foundation 12 with foundation beam rebar 94 extending around the perimeter of the foundation. Foundation beam rebar 94 is a grouping of individual reinforcing bars or rods which effectively form reinforced concrete beams along the perimeter of the foundation. The individual reinforcing bars could be sections of reinforcing bar that are each the length of one side of the foundation, or the individual reinforcing bars could be a continuous member extending along all four side of the foundation. The FIG. 17 embodiment shows the foundation formed of a continuous concrete slab. However, in other embodiments, the foundation could be formed only of a concrete perimeter wall, i.e., only the foundation beams without a continuous concrete slab occupying the space between the beams. When there is not a continuous concrete slab, a pedestal footing 99 (explained below) may be positioned within the perimeter wall. The phrase "formed of" is intended to be inclusive, i.e., synonymous with "including." The rectangular foundation seen in FIG. 17 may have sides of the same length (a square) or the nonparallel sides may be of different lengths. Moreover, the foundation perimeter wall need not be rectangular, but could take on any shape advantageous for the particular tower design, e.g., octagonal or circular.

Figure 20:
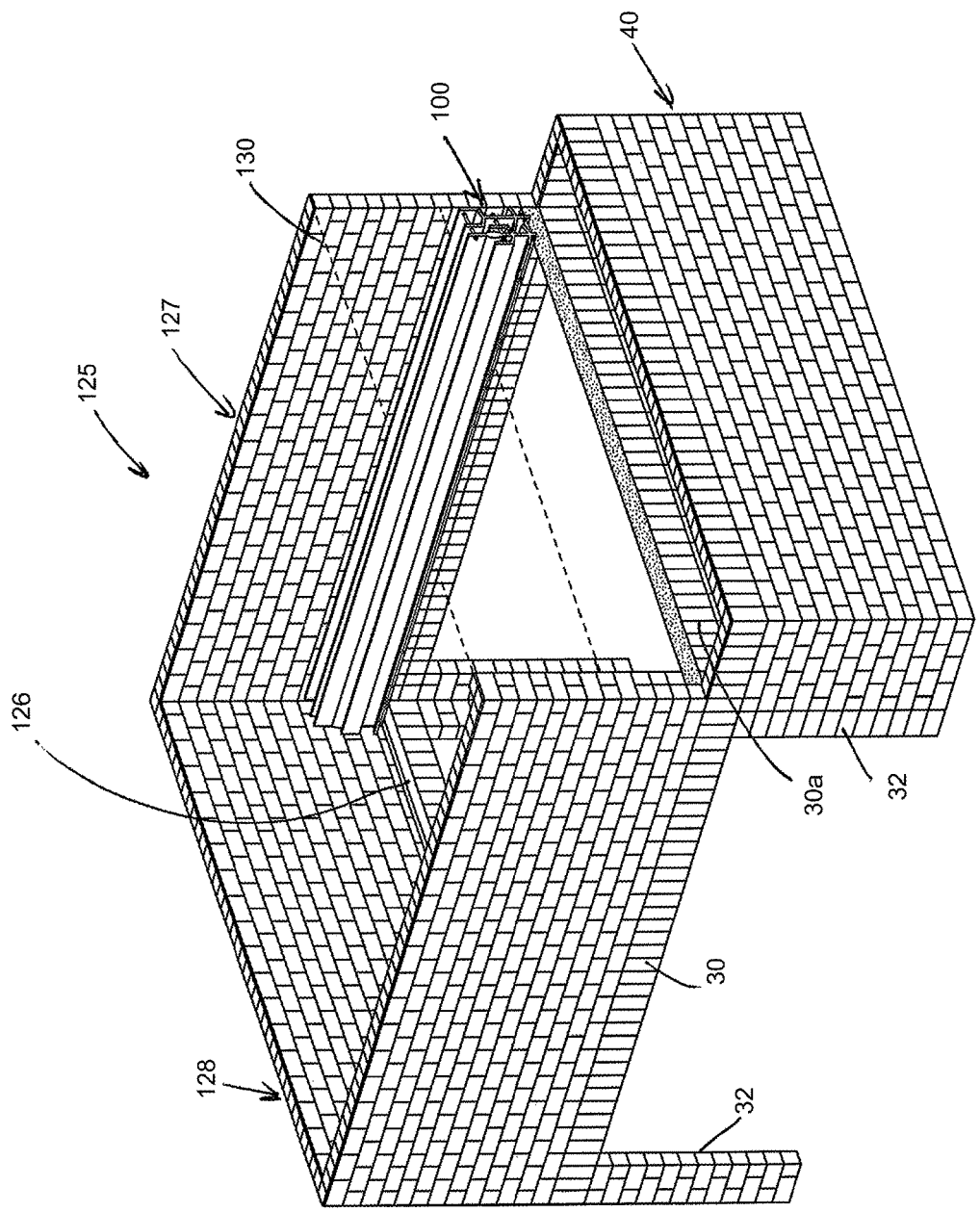
FIG. 20 is a perspective view of a cooling tower during construction according to one method of the present invention.

FIG. 17 also illustrates a group of reinforcing bars employed for forming columns extending upward from the foundation 12. In FIG. 17, one of these column rebar groupings 98 is positioned in each corner of the foundation 12 and a fifth column rebar grouping 98 is positioned in the center of the foundation to form the fan support column or fan pedestal. The rebar for the fan pedestal will extend upward from a concrete pedestal footing 99. Pedestal footing 99 may be part of a continuous slab or pedestal footing 99 can be a separate block of concrete positioned within the perimeter foundation walls when the foundation is not a continuous slab. In preferred embodiments, the column rebar groupings 98 will be tied into the foundation beam rebar groupings 94 prior to placing of the concrete forming foundation 12. CMU blocks may be positioned with the column rebar groupings 98 extending through the center apertures of the CMU blocks. The CMU blocks can be mortared into place and concrete poured into the CUM block apertures encompassing the column rebar groupings 98. As best seen in FIG. 20, the CMU based columns 32 may either be free standing columns or they may be incorporated into other tower structure such as the basin 40. As used herein, a column "formed of" CMU blocks means a column which includes CMU blocks, but may also have concrete, rebar, and other elements as part of the column structure.

Bond beam rebar groupings 96 will also extend parallel to the perimeter of foundation 12. The bond beam rebar groupings will typically be positioned at least four feet above foundation 12, and more typically between eight feet and twelve feet above foundation 12. The illustrated embodiment of bond beam rebar groupings 96 will tie into column rebar grouping 98 and the bond beam rebar groupings 96 can then act as the reinforcing steel when positioned in the channel of the deep lintel (i.e., U-shaped) CMU blocks 74 (see FIG. 5), which are then filled with concrete to form the bond beams 30 described above. The FIG. 17 embodiment shows one side of the cooling tower housing having a second, higher elevation bond beam rebar grouping 96. The higher bond beam rebar grouping will serve as the reinforcing steel for second bond beam shown as 75 in FIG. 9. With the various rebar groupings (except for the foundation rebar) cemented into column and bond beam CMU blocks, the remainder of the cooling tower housing may be constructed with CMU blocks using conventional masonry techniques. In many embodiments, a single rebar rod 92 will be placed in the housing walls every fourth or fifth course of CMU blocks to increase the rigidity of the wall structure.

Figure 18:
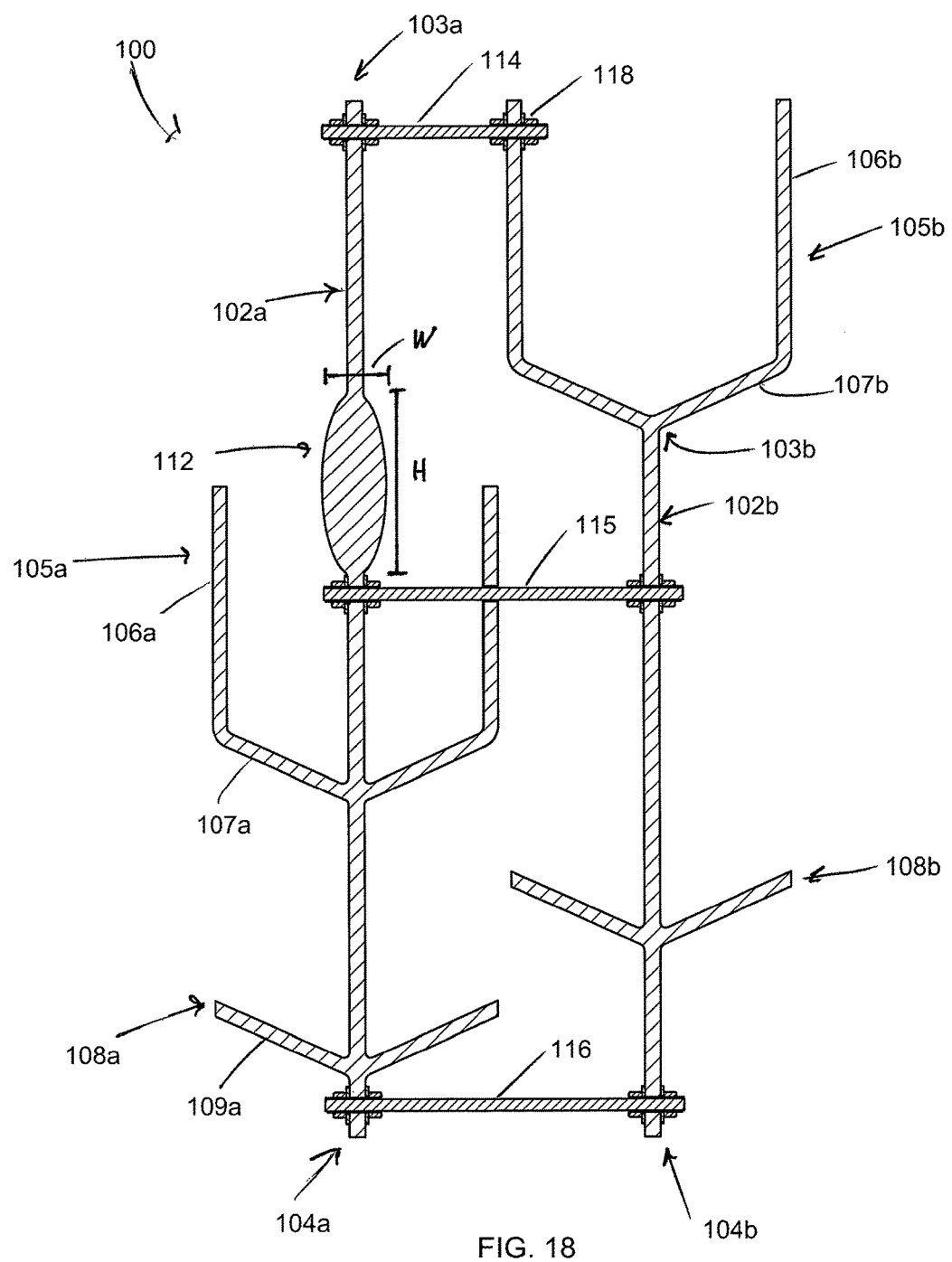
FIG. 18 is an end-view of one embodiment of a liquid collection trough assembly.
Figure 19:
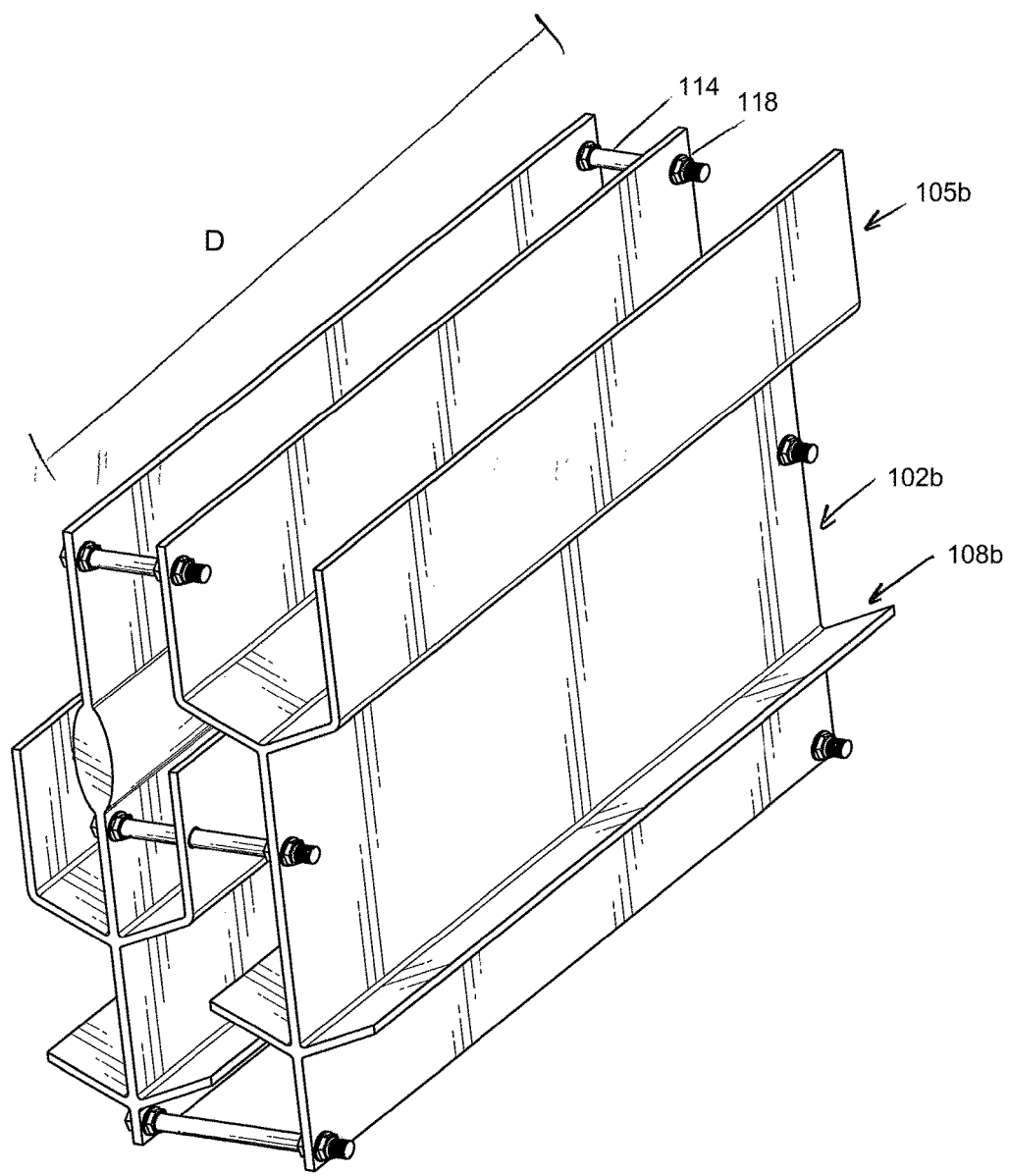
FIG. 19 is a perspective view of the collection trough assembly of FIG. 18.

FIGS. 18-20 illustrate an embodiment of constructing liquid collection troughs and constructing a cooling tower employing these troughs. FIG. 18 is an end view of the liquid collection trough assembly 100. The tough assembly 100 is generally formed from two vertical webbing sections 102a and 102b with upper end 103a and lower end 104a. Webbing 102a includes the upper or first trough 105a and the lower or second trough 108a. The illustrated upper trough 105a is integrally formed with the webbing 102a and has a substantially vertical portion 106a and an angled portion 107a. As used herein, an "angled portion" connotes a portion extending along an angle between the vertical and horizontal (e.g., between 0° and 90°, between 90° and 180°, between 180° and 270°, etc.). The angled portion 107a will typically extend at an angle of at least 30° from the vertical and in FIG. 18, is shown closer to 60° from the vertical. Upper trough 105a may also sometimes be referred to as "substantially U-shaped." In FIG. 18, the vertical coincides with the orientation of webbing 102 in the cooling tower, i.e., the webbing 102 being substantially parallel to the direction of gravitational force.

Lower trough 108a is position approximate the lower end 104 of webbing 102a. This lower trough is formed of only two oppositely extending angled portions 109a. Again, these angled portions are at least 30°, but closer to approximately 60° in the Figure, from the vertical. Lower trough 108a may also sometimes be referred to as "V-shaped." The first vertical webbing 102a further includes the reinforcing section or stiffening section 112. The reinforcing section 112 will have a height "H" and width or thickness "W." In the illustrated embodiment, the height H of the reinforcing section 112 is at least 10% of the overall length of vertical webbing 102a and the width W is at least 150% of the thickness of vertical webbing 102a.

The second vertical webbing 102b will have an upper trough 105b and a lower trough 108b similar to those just described for first vertical webbing 102a. However, the second vertical webbing 102b has the upper trough 105b integrally formed on the upper end 103b of the vertical webbing. Similar to trough structures previously described in U.S. Published Application No. 2015/0241148, the troughs will be vertically staggered and positioned laterally with approximate overlapping edges to capture liquids falling from above the troughs. Thus, water falling to the left of upper trough 105b (or overflowing to the left from upper trough 105b) will tend to fall into upper trough 105a. Similarly, water overflowing to the rights of upper trough 102a will tend to be captured by lower trough 108b. Although not explicitly shown, it may be envisioned how additional tough assemblies 100 could be positioned to the left and right of the trough assembly 100 seen in FIG. 18 in order to create a continuous vertically staggered and laterally overlapping trough arrangement. For example, one preferred embodiment would construct trough assemblies 100 with four or five vertical webbings 102 bolted together. Other embodiments could have assemblies formed of more or fewer vertical webbings bolted together.

In preferred embodiments, the first and second vertical webbings (together with their troughs) will be created using a conventional or future developed flow forming technique. Nonlimiting examples of flow forming techniques include polymer extrusions methods and polymer pultrusion methods. One more preferred flow forming technique is fiberglass pultrusion. In the case of employing pultruded fiberglass, an example thickness of the webbing could be any thickness between about ¼ and ¾ inches. An example of the vertical length of the webbing could be any height between about 15 and 48 inches. The flow-forming results in vertical webbing, the upper U-shaped trough, and the lower V-shaped trough having a cross-section of continuously formed material. However, the vertical webbings and associated troughs could be formed by alternative methods and materials, such as press-fitting together stainless steel or aluminum sheeting. Metals such as stainless steel will typically be employed in more specialized applications when the fluid contacting the troughs is too corrosive for flow formed materials. To finalize the trough assembly 100, the first and second vertical webbings will be joined by some type of connector or bar extending between the two webbings. In the FIG. 18 embodiment, the connectors are threaded rods with flange nuts 118 engaging each side of the vertical webbings in order to fix the lateral distance between the two webbings. The FIG. 18 embodiment shows an upper connecting bar 114, a mid-connecting bar 115, and a lower connecting bar 116. It can be seen how the mid-connecting bar 115 extends through not only the two vertical webbings 102a and 102b, but also the vertical portion of upper trough 105a. Although only showing a shorten section of a trough assembly 100, FIG. 19 suggests how the connecting bars will be spaced along the length of the troughs at a distance "D." The distance D may depend on numerous factors such as the material from which the troughs are constructed, the design length of the trough assemblies, and the design load the troughs will bear, but in many embodiments the distance D will be between about 12" and 36". While FIG. 18 shows the trough assembly 100 as formed of two vertical webbings 102 bolted together, other embodiments could comprise a single vertical webbing or three (or more) vertical webbings bolted together.

FIG. 20 suggests one method which could be employed to construct a cooling tower employing the trough assemblies 100. FIG. 20 shows a tower housing 125 which may be constructed as previously described with columns 32 supporting the bond beams 30 on which three side walls have thus far been constructed. Two of the columns 32 are freestanding at two corners of the foundation (not shown) and two columns are formed integrally as part of the basin 40. The sidewall adjacent to basin 40 has not been formed yet. The wall opposite basin 40 includes the ledge or shoulder 126 formed thereon and extending six to twelve inches into the interior of tower housing 125. The next step in the method is to position the trough assemblies 100 in the tower housing with one end of the trough assemblies resting on shoulder 126 and the other end of the trough assemblies resting on the front bond beam 30a. The end of trough assemblies 100 resting on front bond beam 30a will extend slightly past the bond beam (e.g., about six inches) in order that liquid from the troughs is deposited into basin 40. Typically, shoulder 126 is at a slightly higher elevation than bond beam 30a such that the troughs have a downward slope to direct liquid into basin 40. This placement of trough assemblies 100, one adjacent to another, is continued until the trough assemblies extend substantially completely across the open bottom of the housing. Typically, it is not necessary to bolt the separate trough assemblies together after placement in the tower housing, but there may be special applications where it is advantageous to do so. Although not shown, the remaining wall (as suggested by dashed lines 130) could be constructed above the trough assemblies by forming a bond beam immediately above the trough assemblies followed by regular CMU blocks positioned on the bond beam.

Figure 21:
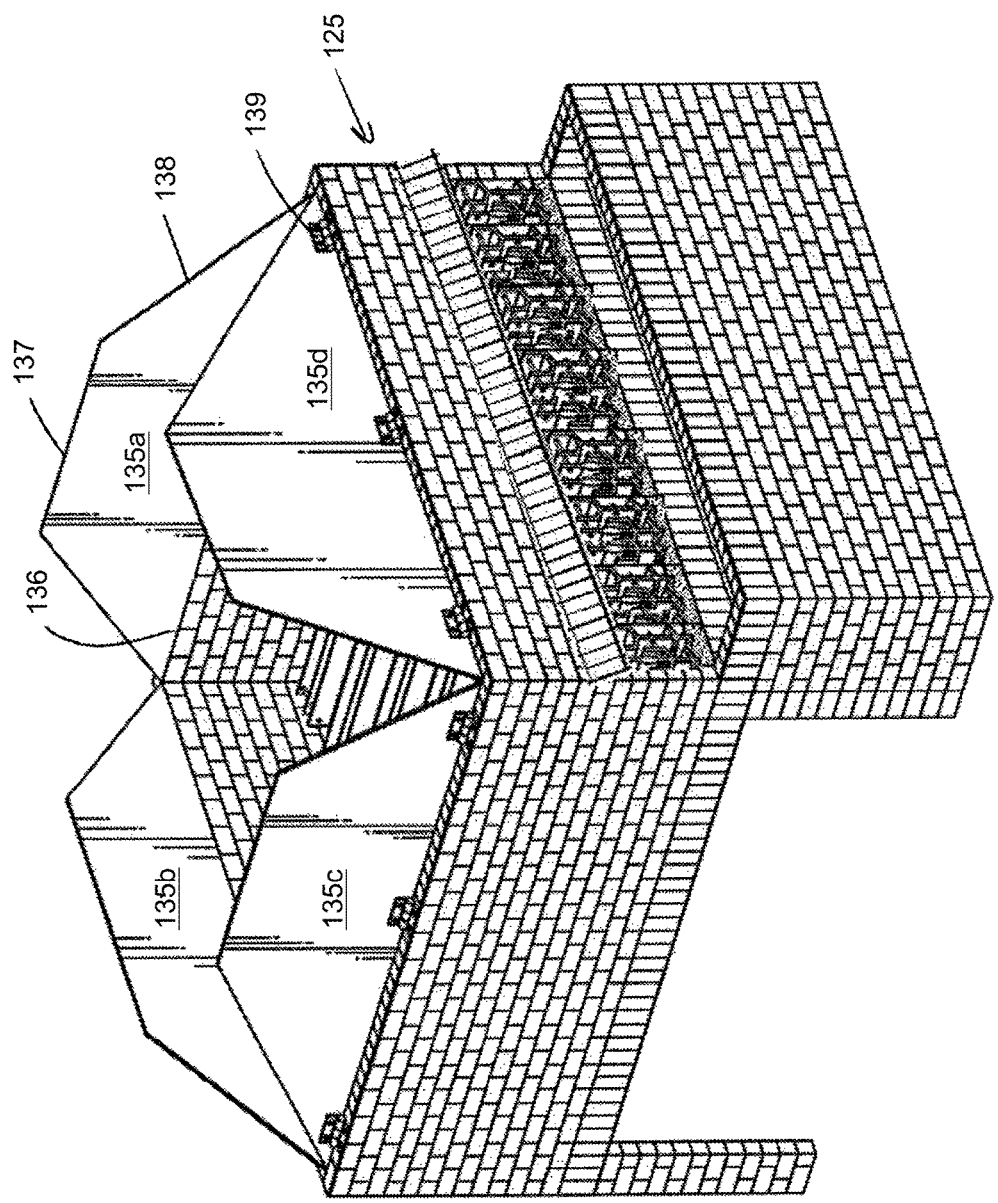
FIG. 21 is a perspective view of a cooling tower equipped with shroud panels.

FIG. 21 illustrates a further embodiment of the present invention. FIG. 21 shows a tower housing 125 which has been equipped with four housing shroud panels 135a to 135d. The illustrated covers 135 are trapezoidal in shape with a base 136 fixed to the top of each of the four tower sidewalls. The covers include a top side 137 generally parallel to the base 136 and two inclined sides 138. The distance from base 136 to top side 137 will sometimes be referred to as the "height" of the panel. The base 136 of the covers will be attached to the top of the sidewalls by a series of hinges 139. Hinge stops (not shown) will act to limit the rotation of the covers between their fully open position (just short of parallel to the sidewalls) to their fully closed position (approximately perpendicular to the sidewalls covering the open top of the tower housing). In one example, the fully open position will entail the shroud panels being positioned at least 10° from the vertical, e.g., 10° to 45° from the vertical (or any sub-range there between). Of course, in other embodiments, the covers could be limited to a smaller degree of rotation or a wider degree of rotation. Nor is it necessary that the shroud panels be connected exactly at the top of the wall, but they could possibly be connected at a point approximate the walls' tops. It will be understood that inward inclination of the shroud panels will somewhat constrict the open area at the top of the tower. This will increase the velocity of saturated air exiting the tower and help avoid this saturated air being drawn into the intake area of this tower or another nearby tower.

Shroud panels 136 will typically be constructed of a comparatively light-weight material such as fiberglass or thin sheet metal. In the case of rotating shroud panels 136, the panels are designed to be lifted to a more open position by the air flow force generated by the fan at the bottom of the tower housing. It can be envisioned how the inclined sides 138 of the shroud panels will tend to meet as shroud panels approach the closed position. However, shroud panels 138 in the closed position do not necessarily completely enclose the open top of tower housing 125. For example, the truncated top sides 137 will leave a small open area even if the shroud panels 136 are in the completely closed position. The height of the shroud panels can vary as needed to direct the saturated air away from the tower's intake at the bottom of the tower. As one example, the shroud panels would have a height of at least four feet and might be six, eight, ten, or twelve feet in height. Of course, other embodiments could have fewer or more four shroud panels, e.g., only two rectangular shroud panels on opposing walls. Moreover, not all embodiments need have rotating shroud panels, i.e., there could be embodiments with the shroud panel being fixed in its open (normal operating) position of at least 10° from the vertical.

Figure 22:
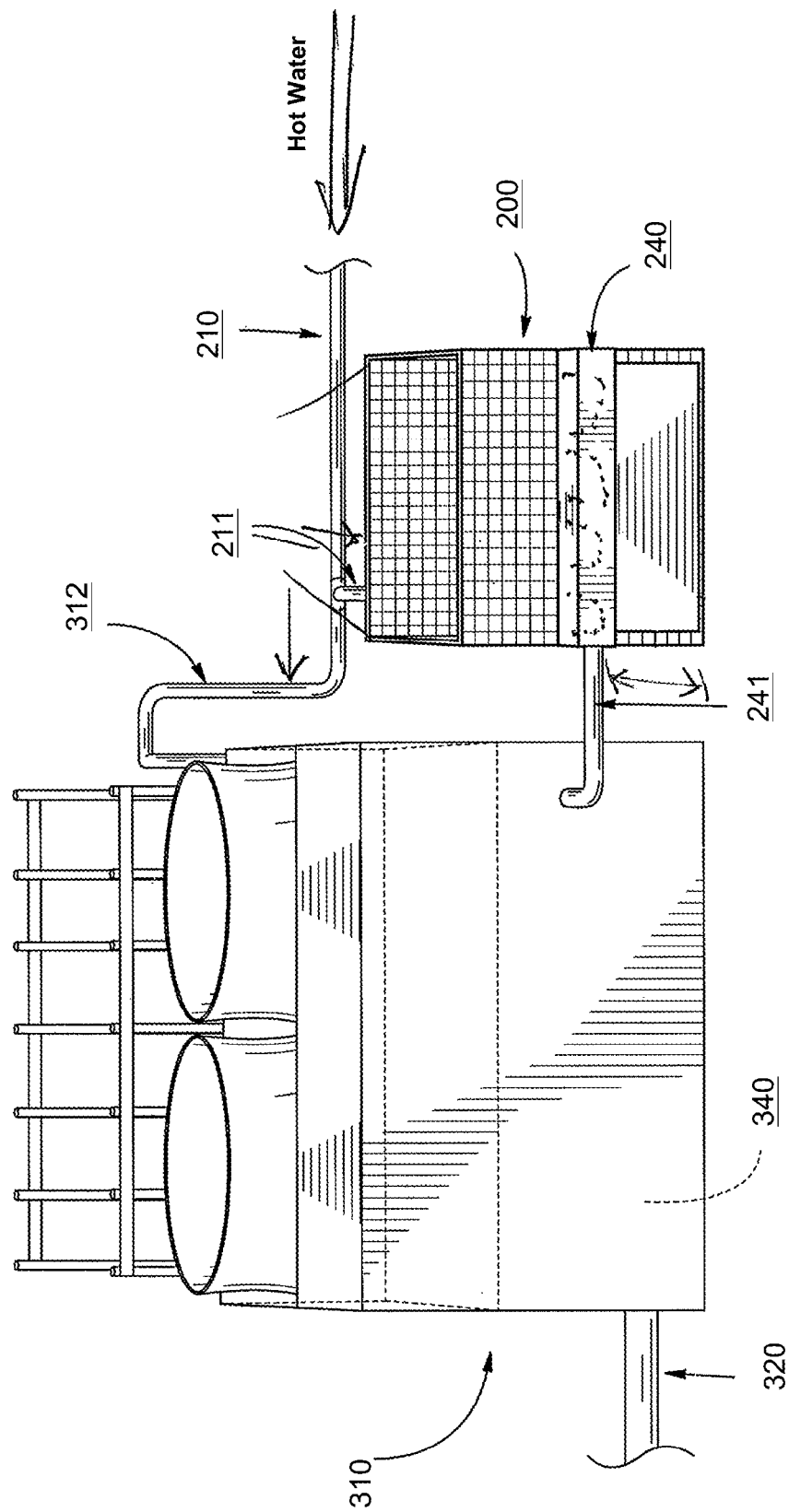
FIG. 22 is schematic representation of one method for increasing the cooling capacity of an existing cooling tower.

FIG. 22 illustrates a still further embodiment of the present invention. FIG. 22 shows a method of supplementing the capacity of an existing cooling tower 310. The existing (or primary) cooling tower may be any conventional or future developed cooling tower, whether of the counterflow configuration or otherwise. Existing cooling tower 310 will include a supply (warmer) water pipe or input line 312, a water reservoir 340 which collects the water cooled by tower 310, and the cooled water output pipe or line 320. A secondary cooling tower 200 may be constructed in proximity to the existing cooling tower 310. Secondary cooling tower 200 will typically be constructed similar to one of the examples described in reference to the previous figures, but could alternatively be constructed by other methods. Secondary cooling tower 200 will differ from previously described towers in that it does not have a basin 40. Rather, cooling tower 200 simply has collector drain 240 which has minimal or no storage capacity as compared to basin 40. In many embodiments, the height of secondary cooling tower 200 is such that its collector drain 240 may gravity flow through drain pipe 241 into water reservoir 340 at or above the latter's high water point. The main supply (warmer) water line 210 is split between secondary cooling tower supply (input) line 211 and the existing cooling tower supply (input) line 312. The warmer water from main supply line 210 is split with a percentage of the water being directed to secondary supply line 211 (and the reminder to existing (or primary) supply line 312. Preferred embodiments of the secondary cooling tower 200 could be designed (sized) to receive anywhere from about 5% to 50% of the warm water from main supply water line 201.

As used herein, the term "about" or "approximately" applies to all numeric values, whether or not explicitly indicated. These terms generally refer to a approximations that may vary by (+) or (−) 20%, 15%, 10%, 5%, or 1%. In many instances these terms may include numbers that are rounded to the nearest significant figure. Those skilled in the art will recognize many obvious modifications and variations on the specific embodiments described above. All such modifications and variations are intended to come within the scope of the following claims.

The invention claimed is:
1. A method of constructing a cooling tower comprising the steps of:
(a) providing a tower housing including (i) a foundation wall, (ii) a least four columns extending upward from the foundation wall, (iii) beams extending between at least three of the columns, the beams being at least four feet above the foundation, (iv) housing walls extending upward from each of the beams, thereby forming an open end to the housing, and (v) a trough support shoulder extending inwardly from a housing side opposite the open end;
(b) positioning a plurality of liquid collection trough assemblies between the trough support shoulder and the open end of the housing, the collection trough assemblies including:
(i) a first vertical webbing having a upper end and a lower end, the first vertical webbing including a first trough and a second trough between the upper and lower ends of the first vertical webbing;
(ii) a second vertical webbing having an upper end and a lower end, the second vertical webbing including a first trough positioned on the upper end of the second vertical webbing and a second trough positioned above the second trough of the first vertical webbing;
(iii) wherein the troughs are positioned in an overlapping relationship such that water falling from above the troughs are captured therein; and
(iv) at least two bars extending through, and being fixed to, each of the first and second vertical webbings;
(v) wherein each of the vertical webbings are integrally flow-formed with their respective troughs.

2. The method according to claim 1, wherein each collection trough assembly includes at least four vertical webbings at the time the collection trough assemblies are positioned within the housing.

3. The method according to claim 1, wherein additional collection trough assemblies are positioned in the housing until the trough assemblies extend substantially completely across an open bottom side of the housing.

4. The method according to claim 1, wherein the fill media is positioned above and is supported by the collection trough assemblies and at least one fan is positioned beneath the collection trough assemblies.

5. The method according to claim 1, wherein there is no intermediate support of the collection trough assemblies between the trough support shoulder and the open end.

6. The method according to claim 1, further providing a water basin positioned to allow the collection trough assemblies to drain liquid into the water basin.

7. The method according to claim 1, wherein the support shoulder is at a higher elevation than a ledge of the open end upon which the collection trough assemblies rest.

8. The method according to claim 1, wherein the steps of providing columns, beams, and housing walls include the step of constructing the columns, beams, and walls with CMU blocks.

9. The method according to claim 1, wherein the step of positioning the collection trough assemblies includes positioning at least two collection trough assemblies in separate steps.

10. The method according to claim 1, wherein the foundation wall forms part of a continuous concrete foundation slab.

11. The method according to claim 1, further comprising positioning a shroud approximate a top of each wall, the shroud being at least three feet in height and inclined between 10° and 45° from a vertical.

12. A method of constructing a cooling tower structure to house a cooling tower system comprising the steps of:
(a) forming a concrete perimeter foundation wall, the foundation wall including a perimeter rebar grouping;

(b) forming at least four columns with CMU blocks positioned approximate at least two corners of the foundation wall, each column including a column rebar grouping being tied into the perimeter rebar grouping;

(c) forming at least three bond-beams with CMU blocks, an end of each bond-beam connecting to a column at least four feet above the foundation, the bond-beams including beam rebar groupings tying into at least one of the column rebar groupings; and (d) forming a pedestal column rebar grouping positioned within the foundation wall, the pedestal column rebar grouping extending upward from a concrete pedestal footing.

13. A cooling tower structure comprising:

(a) a concrete perimeter foundation wall, the foundation wall including a perimeter rebar grouping;

(b) at least four columns including CMU blocks, at least two columns being freestanding and positioned approximate corners of the foundation wall, each column including a column rebar grouping being tied into the perimeter rebar grouping;

(c) at least three bond-beams including CMU blocks, an end of each bond-beam connecting to a column at least four feet above the foundation, the bond-beams including beam rebar groupings tying into at least one of the column rebar groupings;

(d) housing walls including CMU blocks, the housing walls extending upward from the bond beams;

(e) at least one fan on at least one pedestal column positioned within the foundation wall, a pedestal rebar grouping extending though the pedestal column from a concrete pedestal footing;

(f) a series of water collection trough assemblies positioned within the cooling tower above the fan; and (g) fill media positioned in the cooling tower above the collection trough assemblies.

14. The cooling tower structure according to claim 13, wherein the foundation wall and the pedestal footing form part of a continuous concrete foundation slab.

15. The cooling tower structure according to claim 13, wherein at least two columns are integrally formed as part of a collection basin.

16. The cooling tower structure according to claim 13, wherein the bond-beams comprise a U-shaped CMU block with the rebar grouping cemented into a U-shaped section of the CMU block.

17. The cooling tower structure according to claim 13, wherein the water collection trough assemblies are supported at opposing tower walls with no intermediate support of the collection trough assemblies between the opposing housing walls.

18. The cooling tower structure according to claim 17, wherein a first end of the collection trough assemblies rests on a shoulder extending inwardly from one housing wall and a second end of the collection trough assemblies rests on the opposing housing wall.

19. The cooling tower structure according to claim 18, wherein the second end of the collection trough assemblies are positioned to direct water into a basin formed below the collection troughs.

20. The cooling tower structure according to claim 13, wherein a nozzle array is positioned above the fill media.

* * * * *